H. A. W. GRUBE.
SURGICAL APPARATUS FOR DRYING WOUNDS OR THE LIKE.
APPLICATION FILED MAY 4, 1911.
1,008,815.  Patented Nov. 14, 1911.
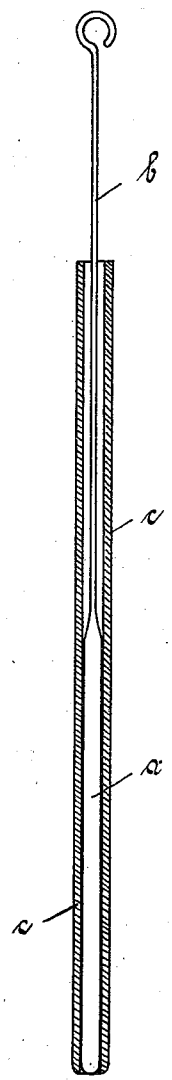
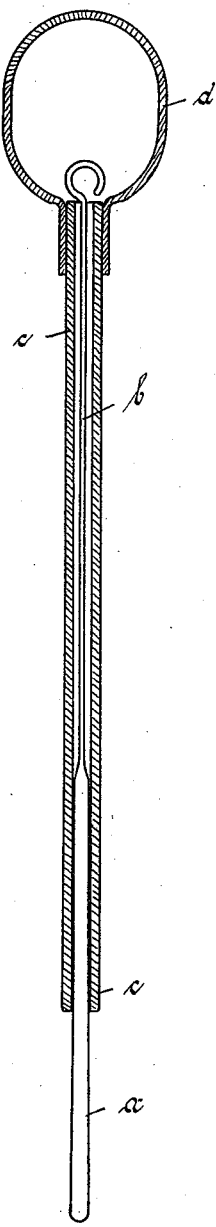

UNITED STATES PATENT OFFICE.

HARRY AUGUST WILHELM GRUBE, OF HAMBURG, GERMANY.

SURGICAL APPARATUS FOR DRYING WOUNDS OR THE LIKE.

1,008,815. Specification of Letters Patent. Patented Nov. 14, 1911.

Application filed May 4, 1911. Serial No. 625,017.

*To all whom it may concern:*

Be it known that I, HARRY AUGUST WILHELM GRUBE, merchant, a subject of the German Emperor, and resident of No. 16 Ferdinandstrasse, Hamburg, Germany, have invented certain new and useful Improved Surgical Apparatus for Drying Wounds or the Like, of which the following is a specification.

This invention relates to apparatus by means of which the parts to be treated in surgical operations such as wounds, mucous membranes or the like, can be dried. This was formerly effected by means of pipettes which were provided with a hole at the front end through which the moisture could pass to the interior, or by means of sterilized strips of bandage gauze which absorbed the moisture. In both cases the drying is difficult especially with deeply lying organs where the introduction of the strips of gauze is seldom easy to effect.

The invention consists in an improved apparatus for the drying of wounds or moisture secreting parts of the body, in which a solid strongly absorptive rod of burnt porous clay or kieselguhr, provided with a handle is inserted in a tube by means of which it is introduced to the part to be treated and after withdrawal of the tube brought into contact with the part to be dried. The rods are of various forms and sizes, according to the particular purpose for which they are intended and are burned at a high temperature so that they give out all their moisture and at the same time are thoroughly sterilized. In this manner the parts to be treated such as the urine tubes in men, or the vagina in women for example may be dried by partly withdrawing the tube by means of which the rod is introduced, so that this latter comes into direct contact with the parts to be dried whereupon an energetic suction of the moisture into the rod takes place. The effect can be intensified by producing a partial vacuum in the tubes by means of a bulb or the like.

In the accompanying drawing: Figure 1 is a longitudinal section of a surgical apparatus embodying my invention; and Fig. 2 a similar section showing the sheath raised and provided with a flexible bulb.

The apparatus consists essentially of a porous rod $a$ provided with a handle $b$ and inserted in the open ended sheath or tube $c$ (Fig. 1). If the tube is partly withdrawn the rod $a$ comes into contact with the part to be treated (Fig. 2) whereupon the withdrawal of moisture from the part in question takes place. By means of a bulb $d$ at the top of the tube $c$ the withdrawal of the moisture may be assisted, a partial vacuum being produced in the tube by the expansion of the compressed bulb.

By means of such a device drugs can be introduced to the deep lying parts to be treated. For this purpose the rod $a$ is immersed in the liquid drug until it is saturated, and then brought into contact with the part to be treated by means of the tube, whereupon the drug is driven out of the rod by means of pressure.

What I claim is:—

1. A surgical apparatus comprising an absorptive rod, and a sheath engaging said rod.

2. A surgical apparatus comprising an absorptive rod having a handle, and an open ended sheath engaging said rod.

3. A surgical apparatus comprising an absorptive rod, a sheath engaging said rod, and an elastic bulb secured to one end of said sheath.

Signed by me at Hamburg, Germany, this 21st day of April 1911.

HARRY AUGUST WILHELM GRUBE.

Witnesses:
    AUGUST WENK,
    ERNEST H. L. MUMMENHOFF.

---

Copies of this patent may be obtained for five cents each, by addressing the "Commissioner of Patents, Washington, D. C."